United States Patent [19]

Vela et al.

[11] Patent Number: 5,366,138

[45] Date of Patent: Nov. 22, 1994

[54] WEAR RESISTANT DIE FACE AND METHOD

[75] Inventors: Timothy M. Vela, Montgomery, N.Y.; David H. Atkinson, Oradell, N.J.

[73] Assignee: Alloy Technology International Inc., West Nyack, N.Y.

[21] Appl. No.: 57,715

[22] Filed: May 5, 1993

[51] Int. Cl.⁵ .................... B23K 28/00; B23K 103/16
[52] U.S. Cl. ..................... 228/176; 76/107.1; 419/8; 419/28
[58] Field of Search ............... 419/8, 9, 28; 228/176; 76/107.1, 107.6, DIG. 6

[56] References Cited

U.S. PATENT DOCUMENTS 4,670,215  6/1987  Morishita et al. ............... 419/9
4,917,961  4/1990  Tsujii et al. ............... 419/9 X Primary Examiner—Kenneth J. Ramsey
Attorney, Agent, or Firm—Donald D. Mon

[57] ABSTRACT

A method to form a composite wear resistant die face of titanium carbide, tungsten carbide/cobalt alloy or similar material having a metal backing which is readily bondable to a substrate. Since sintered powdered metallurgy wear resistant materials are difficult to solder or braze directly to a die by conventional methods, a steel backed composite is formed by hot isostatic pressing of the wear resistant material to both sides of a steel substrate and this composite is cut through the middle of the steel blank to formed separate steel backed wear resistant die facing plates, especially useful for pelletizers.

5 Claims, 3 Drawing Sheets

WEAR RESISTANT DIE FACE AND METHOD

FIELD OF THE INVENTION

A wear resistant die face, especially useful for underwater pelletizers, in which knives are moved across the die face to cut strands of plastic material into pellets, and a method for making the die face.

BACKGROUND OF THE INVENTION

Billions of pounds of polyethelene and polypropylene are processed into pellet form annually. The pelletizing operation is accomplished with three basic components: an extruder, a die body with a wear resistant surface, and knives. The extruder's function is to melt the various plastics and homogeneously mix additives into this melt which enhance the properties of the plastic. This melt is then forced through the die under very high pressure. Pre-drilled holes in the die create strands of the melt which solidify as they contact the water environment which surrounds the die body. Knives pass in intimate contact with the face of the die and cut the strands of plastic into pellet form which then float to the surface of the water and are collected.

Die face materials, in combination with knife materials, play a critical role in determining the productivity and profitability of this extrusion process. Die face materials must be hard, wear resistant, and easily repaired or replaced in order to allow for multiple use of the intricate and expensive die body. Die face materials are also required to be corrosion resistant and must possess a combination of temper resistance, thermal shock resistance, and a low thermal conductivity. The two materials which meet that criteria, and are the most commonly used in the industry, are titanium carbide based metal matrix composites—generally titanium carbide (such composites are for convenience denoted Fe/TiC), and Tungsten Carbide/Cobalt (WC-Co) alloys.

Until recently, WC-Co alloys offered one very distinct advantage over Fe/TiC. WC-Co can be silver soldered or brazed, in air, to the die body with a resulting bond strength sufficient to withstand the pressures applied in extrusion operations. This is a relatively simple and inexpensive process. On the other hand, Fe/TiC die face material usage has been limited due to the difficulty of bonding it to the die body. Fe/TiC cannot be silver soldered or brazed directly to the die by conventional methods. It instead requires a sophisticated vacuum brazing process performed at very high temperatures. Even with the vacuum brazing process, the success rate was unpredictable and all too often the bonding was non-uniform or incomplete. In some cases, where an incomplete bond allowed plastic to flow into the gap between the die face and the die body, catastrophic failure occurred. When a die face fails, the extruder must be shut down and overhauled. The downtime cost for one of these units is several thousand dollars per hour.

It is a serious disadvantage of the tungsten carbide grains in the WC-Co alloys that they are generally angular with sharp edges, whereas titanium carbides in Fe/TiC alloys are smooth and rounded. These rounded carbides provide a "slippery" surface which greatly reduces metal-to-metal contact in rubbing wear applications. In contrast the angularity and sharp edges of the tungsten carbide grains tend to tear and cut mating materials at the microscopic level, for example, the faces of the knives. The rounded grains of Fe/TiC are less wearing. The mass change of mating materials run against the Fe/TiC is often nearly 40% less than the same material run against a WC-Co surface. In addition, the average coefficient of friction for an Fe/TiC surface is found to be approximately 19% lower than that of the WC-Co surface.

Both results illustrate the superiority of a Fe/TiC surface compared to a WC-Co surface for a die face material, especially, but not exclusively, for pelletizers. The low coefficient of friction means less force is required to rotate the knives against the die face, which in turn means that less heat is generated at the surface of the die. The reduction in frictional force and heat generation will reduce energy consumption. The low mass change of the mating material translates into longer knife life and reduced downtime. Finally, Fe/TiC alloys in general are almost 2½ times less dense than WC-Co alloys. Heat transfer ratio is proportional to the density of a material. It follows that an additional reduction in energy consumption will be realized because the Fe/TiC will transfer less heat to the water which surrounds the face.

It is the object of this invention to provide an improved die face, reliably overlaid by Fe/TiC, and a method to make it.

BRIEF DESCRIPTION OF THE INVENTION

This invention is a replaceable pelletizer die plate, a method for making it, and a method for applying it to an existing die body.

The die plate comprises a steel substrate to which a layer of Fe/TiC material has been diffusion—bonded by hot isostatic pressing ("HIP"). The steel of the plate is selected to match selected properties of the die body, and the die plate is brazed to the exposed surface of the die body. Apertures through the die plate match passages through the die body, and strands of extruded plastic material exiting the apertures are cut into pellets by knives which pass over the surface of the die plate in a shear-like motion.

According to the preferred method of making this die plate, both faces of the plate receive the Fe/TiC material at the same time during the HIP processing, thereby preventing warping during the process. The plate, with Fe/TiC on both sides, may be split to provide two plates with a single surfaced side, or the Fe/TiC may be removed from one side, prior to brazing the die plate to the die body.

The above and other features of this invention will be fully understood from the following detailed description and the accompanying drawings, in which:

DETAILED DESCRIPTION OF THE INVENTION

Figure 1:
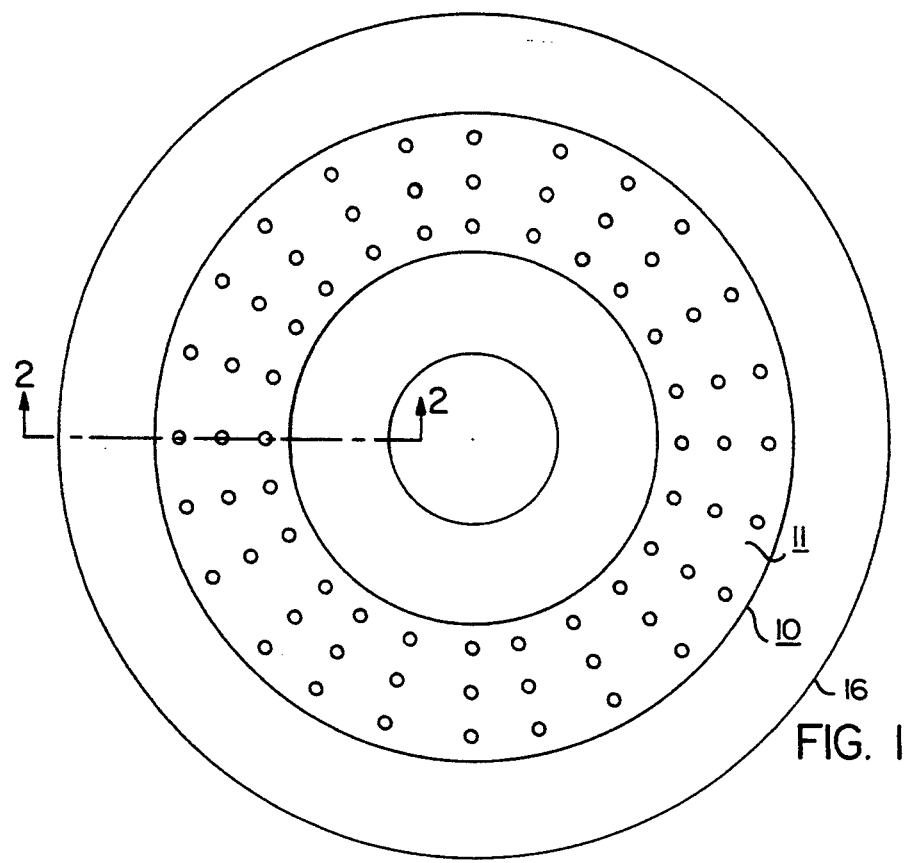
FIG. 1 is a plan view of die body having a die plate according to the invention mounted to it.
Figure 2:
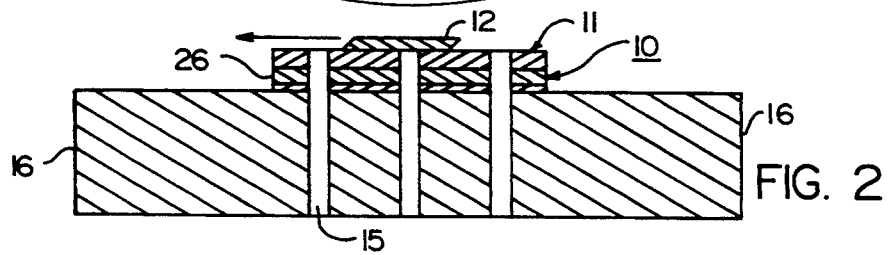
FIG. 2 is a cross-section taken at line 2—2 in FIG. 1.
Figure 3:
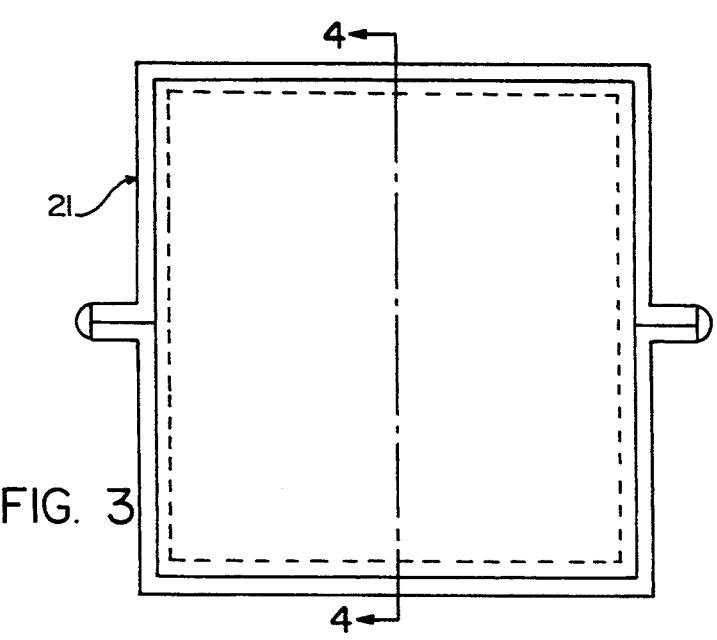
FIG. 3 is a plan view of a bottom for an HIP container.
Figure 4:
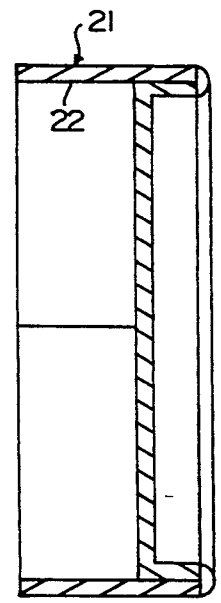
FIG. 4 is a cross-section taken at line 4—4 in FIG. 3.
Figure 5:
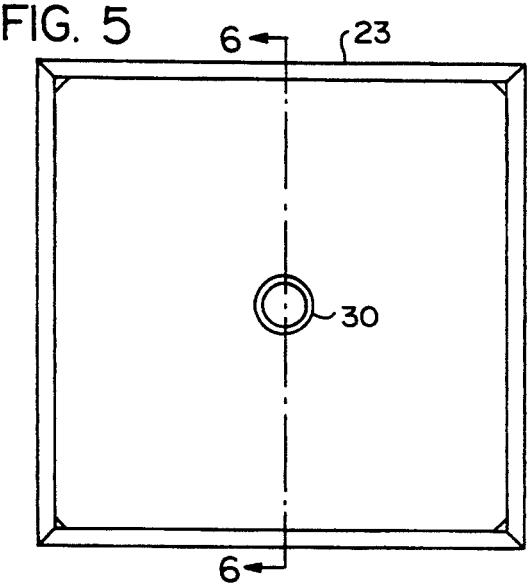
FIG. 5 is a plan view of a cover for the bottom of FIG. 3.
Figure 6:
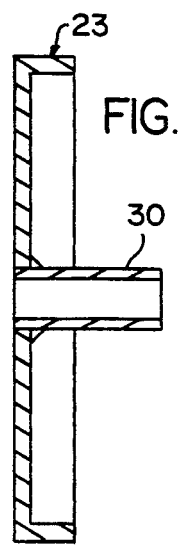
FIG. 6 is a cross-section taken at line 6—6 in FIG. 5.

The ultimate objective of this invention is to provide an improved die face plate 10 with a shear surface 11 across which a knife 12 passes to cut off pellets of plastic material from an extruded strand (not shown). The strand is formed by being pressed through passages 15 through the die body 16 and the face plate 10. A conventional extruder (not shown) forces the material through passages 15. The wear on surface 11 is the critical part of this arrangement. Any reduction to its life is very costly—on the order of several thousand dollars per hour of down time on this substantial system, which is designed for long-term continuous operation.

The application of abrasion-resisting surfaces to die plates is a well-known objective. Still in the known art, the choice of abrasion—resisting materials has been limited to those which could be silver soldered or brazed, in air, to the die body. The resulting layer must resist the strong forces applied to it.

Unfortunately, the facing materials which could reliably be applied by these processes did not include those which provided the best wear resistance, namely TiC granules.

An alloy comprising TiC grains in a ferritic matrix offers the advantage that a matrix material can be selected which is compatible with the material of a steel substrate that is to be used for the die plate. Then, in a process according to this invention, a strong and complete bond can be made between the alloy and the substrate. In so doing, care must be exercised in the selection of the steel matrix for the following reasons:

1. There must be chemical compatibility between the steel substrate so that a suitable bond can be formed.

2. The coefficient of thermal expansion of the matrix and of the substrate must be closely enough matched to prevent the build-up of uneven stresses during heating and cooling, both in fabrication and in actual use.

3. There must be heat treatment compatibility between the matrix and the substrate, because both will be subject to machining operations, and will require annealing or solutionizing treatment, and quenching, tempering or aging to achieve a desired hardness.

Furthermore, these objectives for making the die plate must be met without the use of soldering or brazing materials.

In this invention, the Fe/TiC material is diffusion-bonded to the substrate plate. This is a high-temperature, high-pressure process conducted in an inert gas environment.

The first step in the production of the die face is to prepare the Fe/TiC material as a composite powder. The defined weights of the various elements and of the TiC granules are supplied in powder form to a ball mill. A milling fluid, usually hexane, is added to the mill. The mill is run for a sufficient time to ensure homogenization of the various ingredients and to reduce the powder particles to the proper size. The milling fluid is then removed and the powder is dried under vacuum to prevent oxidation. Following a screening operation to remove any insufficiently reduced particles, the powder is ready for use.

A steel HIP container 20 must be fabricated next. The container is designed to accept the powder and the solid steel substrate. It will protect the powder from the hot argon gas used in the hot isostatic press, while at the same time permitting the transference of heat and pressure required to cause the powder to achieve full density and to bond to the steel. The container is fabricated of a low carbon steel such as 1018 or 1020. It is formed and welded into a desired shape with a bottom 21 having a side wall 22. A separate top cover 23 is provided.

A pelletizer die plate 10 (see FIG. 1) is usually ring shaped. It is possible to form the die plate and the container in the ultimate shape and size desired, but more often they will be formed so the die plate will be assembled from segments. For this reason it is often most advantageous to form the container in a rectangular shape of sufficient size from which a number of segments can be cut. In the illustrated example, the container is rectangular, but the ultimate shape of the products will be segments, cut to shape.

The container is intended to exclude gases (it will be evacuated and hermetically sealed before use), and to be flexible enough to transmit the very high process forces to its contents.

Figure 7:
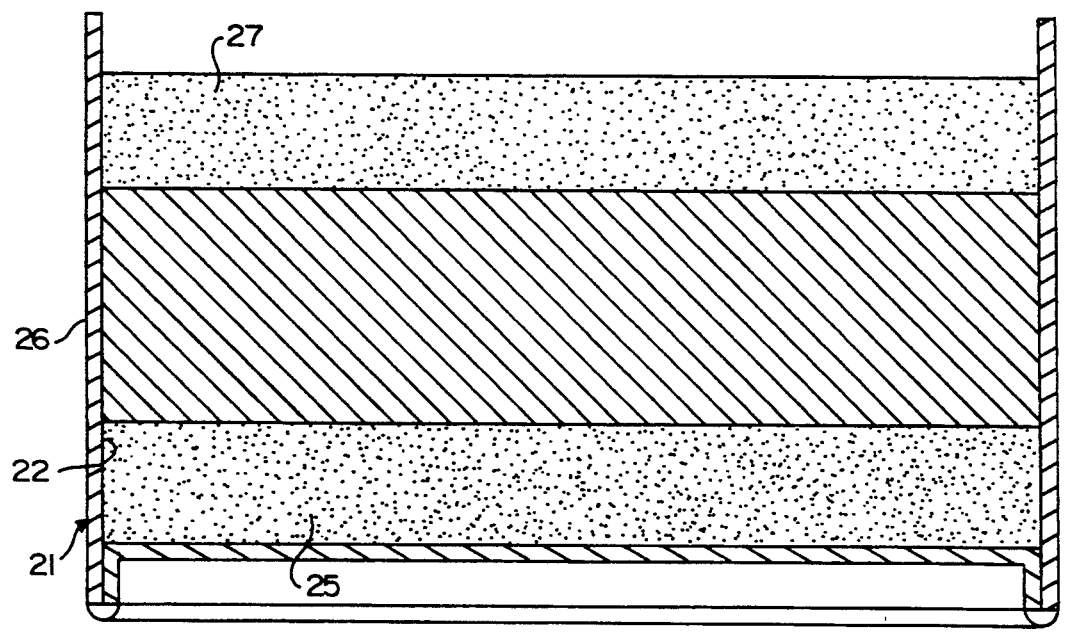
FIG. 7 is a vertical cross-section showing the bottom of the container, loaded, prior to being closed by the cover.

Its surfaces and the surfaces of the substrate are first suitably cleaned. A layer 25 (FIG. 7) of Fe/TiC powder sufficient to form the intended surfacing is placed in the container. The actual amount will be determined from experienced observation. The container is vibrated to even out the layer and to remove much of the entrapped air.

Then the substrate plate 26 is carefully inserted so as not to disturb the powder layer. An equal amount of powder is then poured on top of the plate as layer 27. Again the container is vibrated to even out and to settle the powder.

Figure 8:
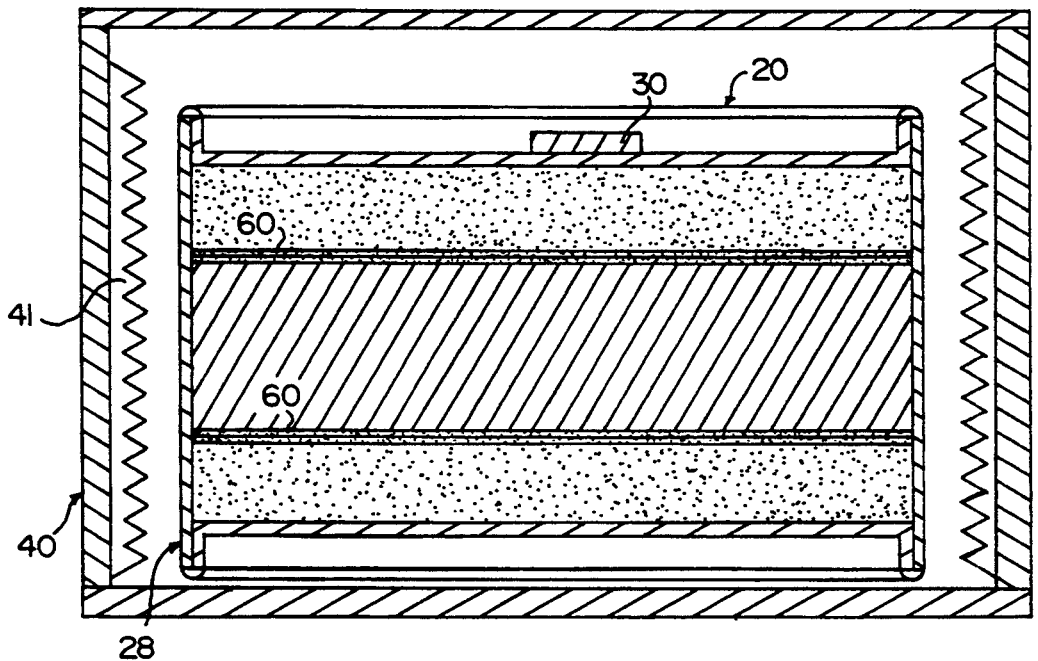
FIG. 8 is a vertical cross-section of the loaded container in a HIP reactor.

Next the top is placed on the container and will be welded in place, resulting in the closed container 28 shown in FIG. 8. The top and bottom firmly bear against the powder layers and hold the powder and the substrate against relative movement.

A vacuum fitting 30 through the top is connected to a vacuum pump (not shown) and the filled container is heated to about 1100 degrees F. Gases and water vapor are drawn off by the vacuum pump. The vacuum pressure is drawn to at least 50 microns. Then the fitting is crimped closed and welded shut.

What has been made to this point is a carefully arranged array of two layers of Fe/TiC materials to be sintered, and a steel substrate with two faces, to each of which the sintered material is to be bonded, sandwiched firmly between the top and bottom of the closed and evacuated container. These faces are straight, flat and parallel to one another.

Next the loaded container will be placed in an HIP vessel 40. This is a closed vessel which can hold very hot gases under very high pressures. The container is placed in it, and the vessel is closed. The vessel is purged and filled with Argon gas. The temperature is raised by induction heaters 41 and the pressure is increased by any suitable means to about 15,000 psi. Because the container is made of a suitably thin material, perhaps ¼ inch thickness, this larger force is transmitted to the contents of the container, because the container will flex to accommodate it.

The temperature is maintained at about 1,200–1,400 degrees F., depending on the materials being processed and will be held at this temperature and pressure long enough for the desired diffusion bonding and alloying of the Fe/TiC to take place. Two to four hours are usually sufficient.

Figure 9:
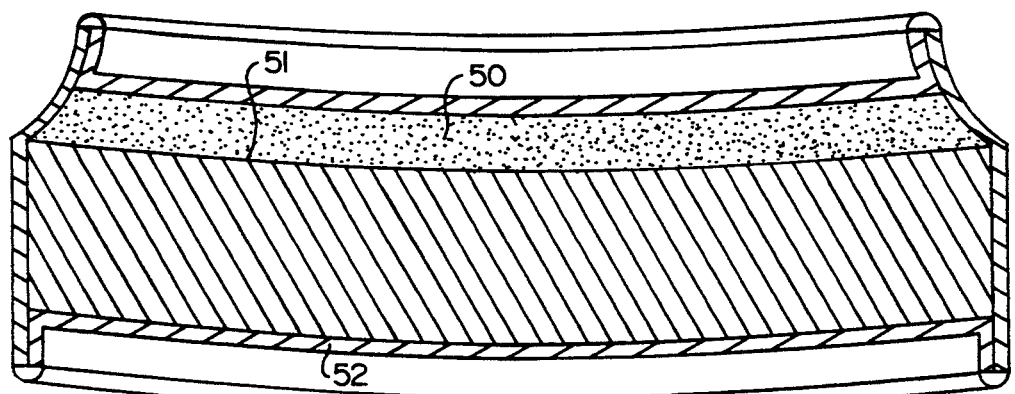
FIG. 9 is a cross-section showing warpage of product when made in a different way.

FIG. 9 illustrates the importance of providing powder on both sides of the substrate plate. The Fe/TiC powder densifies, as it alloys, undergoing a 50% to 60% volume reduction. In practice if as shown in FIG. 9, the powder 50 is applied to only one face 51, the substrate plate 52 will warp severely and be useless. This is avoided by applying the powder to both faces of the substrate plate, which will balance the stresses.

The vessel and the container are cooled, and the container is removed from the vessel. It now consists of a welded structure containing a substrate plate which on two sides has a layer of Fe/TiC. These alloy layers are bonded both to the substrate plate and to the container. Obtaining the product requires removal of the container by machining processes which will remove the container, because the construction is one solid mass.

A bond 60 is schematically shown in FIG. 8 as it will exist after the HIP processing. It will be free of porosities, and consists of a diffusion layer about 200–300 microns thick. Metallurgically it is a gradual blend of the materials, as will be recognized by persons skilled in the art.

The container is suitably jigged and its top, bottom and walls are machined away, such as by milling operation or cutting operations. There results a substrate plate with Fe/TiC bonded to both faces. This cannot be used, because the Fe/TiC layer cannot be directly applied to the die body. Instead, the Fe/TiC must be removed from one face, which is wasteful, even though to make the product it must have been applied to both faces.

Instead, the substrate plate is preferably made somewhat thicker than that for two desired die plates, and is cut in two, to form two single—surfaced die plates. The additional thickness of the double-faced plate will allow for the saw cut.

The die plate will have been suitably processed while in the container, such as by annealing or heat treating so that after it has been freed from the container it can be shaped to a desired configuration.

Now the die plate can be brazed directly to the die body by conventional brazing means between the die body and the uncoated face of the die plate. This will not affect the Fe/TiC. The direct bond between the substrate plate and the die body is conventional and reliable. Holes will be drilled through the plate to match those in the die body. The completed assembly is then heat treated to provide maximum hardness and wear resistance to the Fe/TiC. A suitable material for the substrate plate is 15–5 PH stainless steel.

Suitable Fe/TiC materials are available from Alloy Technology International, Inc., of 169 Western Highway, West Nyack, New York 10994 under its trademark Ferro-TiC. A preferred example of such a material comprises by weight percentage, about 30–32% TiC, 9–10% Cr, 3–6.5% Co, 3–4.5% Ni, 2–4% Mo, 0–1% Al, 1–2% Ti, 0–1% Cu, 40–50% Fe. Variations of this material, especially the relative percentages of TiC and matrix are available and suitable, so long as the matrix can be diffusion bonded to the substrate steel.

This invention is not to be limited by the embodiments shown in the drawings and described in the description, which are given by way of example and not of limitation, but only in accordance with the scope of the appended claims.

I claim:

1. The method of making a die plate for an extrusion die body comprising:
   a. in a gas impermeable metal container having a bottom and a top, each with a planar surface, placing a first layer of powdered constituents of a steel and titanium carbide alloy on the planar surface of the bottom layer, placing a steel substrate plate atop said first layer, said substrate plate having a pair of opposite faces, placing a second layer of said powdered constituents atop the other said surface and laying said top over and against said second layer, said container including a peripheral sidewall encircling said layers and substrate plate, said container being made of a weldable material and of thickness such as to transmit process pressure to its contents;

welding together the top and bottom, heating and evacuating the container, and closing it;

placing the container in a hot isostatic reactor vessel heating the container, and applying fluid pressure in said vessel whereby to heat and strongly compress the container and its contents together, maintaining said heat and pressure for a length of time sufficient for the steels to bond with one another at a bond and for the steel and titanium carbide to alloy with one another to form Fe/TiC as an outer surface;

removing said container from the vessel and heat treating it to conditions wherein the contents of the container can be machined;

mechanically removing the container from its contents;

dividing the contents into two individual plates, each with a single surface of steel and Fe/TiC bonded thereto by cutting through the plate by a cut which is parallel to said faces.

2. A method according to claim 1 in which said layers are vibrated to settle them before the container is closed.

3. A method according to claim 1, including applying one of the thus-formed die face plates to a die body comprising directly brazing its uncoated face to a metal face on said die body.

4. A method according to claim 1 in which said surfaces of said substrate plate are straight, flat and parallel to one another, whereby the said bonds between them and the overlaying Fe/TiC are also straight, flat and parallel to one another.

5. A method according to claim 1 in which said bond is free of porosity with a diffusion layer between about 200 and 300 microns in thickness, metallurgically consisting of a gradual blend of the materials.

* * * * *